2 Sheets--Sheet 1.

W. A. SPRINGER.

Trimming-Attachments for Sewing-Machines.

No. 6,142. Reissued Nov. 17, 1874.

Witnesses:

Thos. H. Dodge
Edwin E. Moore

Inventor:

William A. Springer

2 Sheets--Sheet 2.
W. A. SPRINGER.
Trimming-Attachments for Sewing-Machines.
No. 6,142. Reissued Nov. 17, 1874.
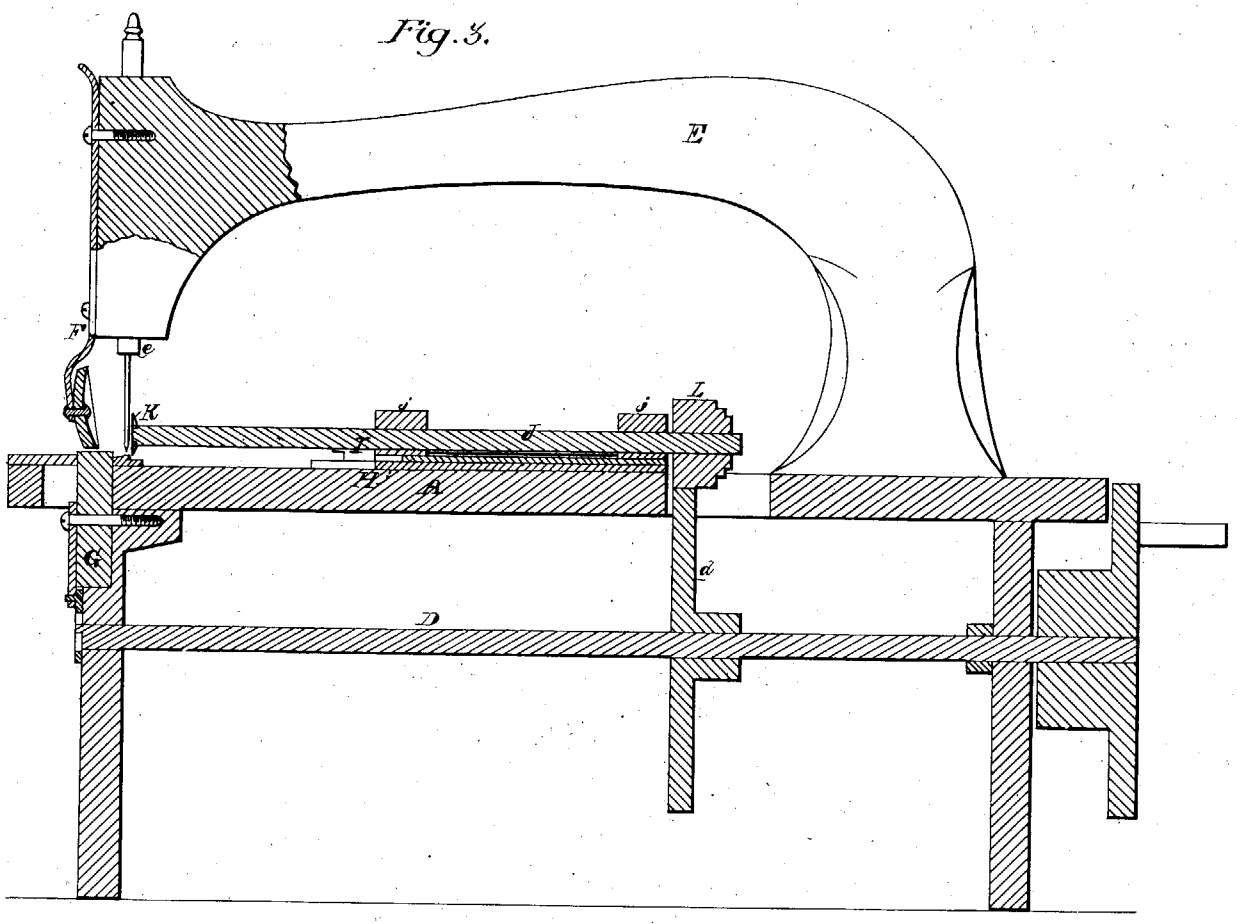
*Witnesses:*
Thos. H. Dodge
Edwin E. Moore
*Inventor:*
William A. Springer

UNITED STATES PATENT OFFICE.

WILLIAM A. SPRINGER, OF MARLBOROUGH, MASSACHUSETTS.

IMPROVEMENT IN TRIMMING ATTACHMENTS FOR SEWING-MACHINES.

Specification forming part of Letters Patent No. 142,290, dated August 26, 1873; reissue No. 6,142, dated November 17, 1874; application filed September 21, 1874.

*To all whom it may concern:*

Be it known that I, WILLIAM A. SPRINGER, of Marlborough, in the county of Middlesex and Commonwealth of Massachusetts, have invented certain new and useful Improvements in Trimming Attachments for Sewing-Machines; and I do hereby declare that the following is a full, clear, and exact description of the construction and operation of the same, reference being had to the annexed drawings making a part of this specification, and to the letters and figures of reference marked thereon.

Figure 1:
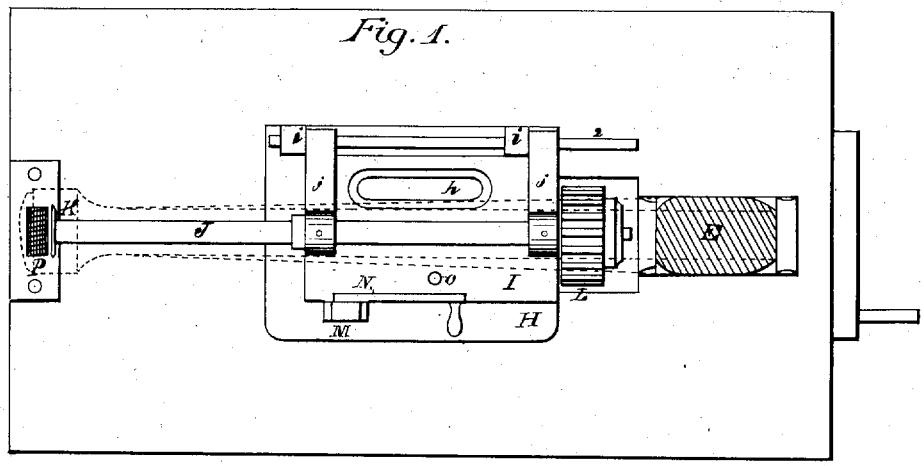
Figure 2:
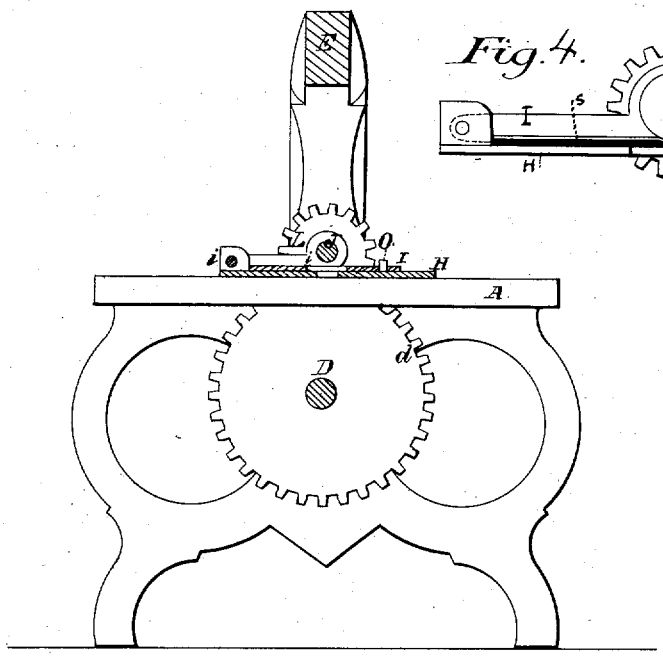
Figure 4:
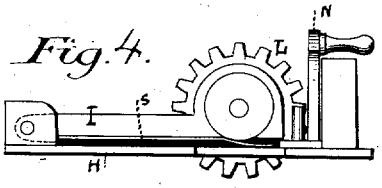

Figure 1 of the drawings is a representation of a top view of my trimming attachment for sewing-machines. Fig. 2 is a cross-section of the same, and Fig. 3 is a longitudinal section of the same. Fig. 4 is a transverse vertical section of the attachment on an enlarged scale, designed to show the elevating-spring.

Only so much of one style of sewing-machines as is necessary to illustrate my said improvements is shown, as the skill of an ordinary mechanic will be sufficient to apply it to the different styles of sewing-machines to which it is adapted.

My invention relates to attachments for trimming seams on sewing-machines; and it consists in the combination and arrangement of the parts hereinafter described and claimed.

The object of my invention is to trim the seam of the fabric sewed in a sewing-machine by a rotary cutter, which, for motion, does not depend on the force of the feed, to the detriment of the same, and of the fabric, which is easily caused to run in curves. The trimming-shaft receives motion from the main shaft of the sewing-machine, and thereby aids the feed-motion in its performance, provided the knife is kept sharp, since the motion of the cutter has a tendency to move the upper part of the material being sewed in the direction of the feed.

In the drawings, A represents the table of a sewing-machine, to which, in the ordinary manner, the main shaft D is attached, which carries a gear-wheel, *d*. The needle-arm E, the needle-bar *e*, the presser-foot F, and the feed-wheel G are of ordinary construction. The trimming apparatus consists of a plate, H, which may be screwed or otherwise fastened to the sewing-machine table, under the needle-arm E. To this plate H the presser-plate I is hinged or pivoted at *i*, so that it may be swung over back, thereby raising the cutter and shaft above the table when occasion requires.

This operation can be performed as follows: Cam-lever N is first turned so as to occupy a reverse position from that shown in Fig. 1, when plate I can be raised so as to clear the steady-pin O, after which plate I and its shaft J can be slipped back on its bearing-rod Q, so as to clear cam-lever N, after which it can be swung entirely over back, if desired.

I prefer to lift the presser-plate I by a spring, *s*, fastened below it, which bears on the plate H. The plate I has two bearings, *j*, for a shaft, J, which has a circular cutter, K, at one end, and a gear-wheel, L, on the other end, which gears into the wheel *d* on the main shaft. The plate H is provided with a lug, M, to which a cam-lever, N, is pivoted, which serves to bring or clamp the presser-plate I down when it is turned over into the position shown in Fig. 1. To keep the plate I from swerving to either side, it is steadied by a pin, O, on the plate H, which passes through a corresponding hole in the plate I at some suitable place. The cam on the lever N is so constructed and arranged that its greatest lever or eccentric part can be moved beyond the perpendicular line between its fulcrum and the presser-plate, which serves to lock it securely.

When the plate I is raised, the wheels L and *d* are out of gear, and the cutter K is inactive. When the plate I is pressed down by the cam-lever N, the cutter K is pressed down on the sewing-machine plate, and the wheels L and *d* are geared together, and the cutter K commences to operate on the cloth or leather as soon as the sewing begins.

The gear-wheels *d* and L may be superseded by two friction-wheels, or by pulleys and belt and a tension-pulley.

The cam or clamp-lever N shows one good mode of locking, clamping, or holding down the trimming mechanism to its working position, and of releasing it again when the cutter and its shaft are to be raised by the action of the spring, but other suitable modes may be adopted for such purposes.

The cutter K has a straight face on the needle side, and is beveled off on the other side to a sharp edge, which bears against a shoulder, P, of the needle-plate, on the needle side. The said shoulder, which may be square or ridged, serves as the second or counter blade, as in a pair of scissors. The plate H is fastened to the sewing-machine table by a thumb-screw, which is passed through a slot, *h*, to facilitate the adjustment of the cutter. The material of the presser-plate I is cut away to make room for the thumb-screw above described.

Having described my improvements in trimming attachments for sewing-machines, what I claim therein as new and of my invention, and desire to secure by Letters Patent, is—

1. The combination, with the rotary trimming-knife and its supporting shaft and bearings, movable toward and away from the work-plate, as described, of an elevating-spring, operating to raise the knife clear of the work, and a depressing or locking device, operating to hold the knife down upon the work against the pressure of the spring, substantially as set forth.

2. In a sewing-machine trimmer, the combination, with the plate H, provided with a slot, *h*, of the hinged pressure or bearing plate I, the depressing and locking or clamping cam-lever N, rotating shaft J, and circular cutter K, substantially as and for the purposes set forth.

WILLIAM A. SPRINGER.

Witnesses:
THOS. H. DODGE,
E. E. MOORE.